(12) United States Patent
Gao et al.

(10) Patent No.: US 12,501,939 B2
(45) Date of Patent: Dec. 23, 2025

(54) AEROSOL GENERATION DEVICE COMPRISING A PRESSURE CAPTURE ASSEMBLY AND ASSOCIATED ASSEMBLY METHOD

(71) Applicant: JT International SA, Geneva (CH)

(72) Inventors: Xu Gao, Shenzhen (CN); Huajun Kuang, Shenzhen (CN)

(73) Assignee: JT International SA (CH)

( * ) Notice: Subject to any disclaimer, the term of this patent is extended or adjusted under 35 U.S.C. 154(b) by 379 days.

(21) Appl. No.: 18/020,579

(22) PCT Filed: Aug. 10, 2021

(86) PCT No.: PCT/EP2021/072284
§ 371 (c)(1),
(2) Date: Feb. 9, 2023

(87) PCT Pub. No.: WO2022/034087
PCT Pub. Date: Feb. 17, 2022

(65) Prior Publication Data
US 2023/0301363 A1    Sep. 28, 2023

(30) Foreign Application Priority Data
Aug. 10, 2020   (WO) ................ PCT/CN2020/108294

(51) Int. Cl.
*A24F 40/51*     (2020.01)
*A24F 40/485*   (2020.01)
(Continued)

(52) U.S. Cl.
CPC ............ *A24F 40/51* (2020.01); *A24F 40/485* (2020.01); *A24F 40/53* (2020.01); *A24F 40/70* (2020.01)

(58) Field of Classification Search
None
See application file for complete search history.

(56) References Cited

U.S. PATENT DOCUMENTS

2015/0068523 A1    3/2015  Powers et al.
2019/0082736 A1    3/2019  Sur
(Continued)

FOREIGN PATENT DOCUMENTS

CN          110432548 A    11/2019
EP           3590363 A1     1/2020
(Continued)

OTHER PUBLICATIONS

International Search Report issued in Appln. No. PCT/EP2021/072284 dated Nov. 29, 2021 (6 pages).

*Primary Examiner* — Cynthia Szewczyk
(74) *Attorney, Agent, or Firm* — Lerner David LLP (57) ABSTRACT

The present invention concerns an aerosol generation device (10), comprising
a bracket extending along a device axis (X),
an outside casing delimiting an interior part of the device configured to receive the bracket and defining an atomizer compartment and a power block compartment, and
a pressure capture assembly comprising a pressure sensor, a flexible housing configured to receive the pressure sensor and a holder configured to fix the flexible housing with the pressure sensor on the bracket. The pressure capture assembly is designed to be arranged on the bracket between the power block compartment and the atomizer compartment to prevent air passage between these compartments.

15 Claims, 5 Drawing Sheets

(51) Int. Cl.
    *A24F 40/53*    (2020.01)
    *A24F 40/70*    (2020.01)

(56)  References Cited

U.S. PATENT DOCUMENTS

| | | |
|---|---|---|
| 2019/0104767 A1 | 4/2019 | Hatton et al. |
| 2019/0159519 A1 | 5/2019 | Bowen et al. |
| 2020/0000146 A1 | 1/2020 | Anderson et al. |
| 2020/0008479 A1 | 1/2020 | Ouyang |
| 2020/0113244 A1* | 4/2020 | Novak, III ........... A61M 11/042 |
| 2020/0154789 A1 | 5/2020 | Novak, III et al. |

FOREIGN PATENT DOCUMENTS

| | | |
|---|---|---|
| EP | 3692827 A1 | 8/2020 |
| WO | 2015/149368 A1 | 10/2015 |

* cited by examiner

FIG.5

AEROSOL GENERATION DEVICE COMPRISING A PRESSURE CAPTURE ASSEMBLY AND ASSOCIATED ASSEMBLY METHOD

FIELD OF THE INVENTION

The present invention concerns an aerosol generation device comprising a pressure capture assembly.

The present invention also concerns an assembly method of such an aerosol generation device.

BACKGROUND OF THE INVENTION

Different types of aerosol generation devices are already known in the art. Generally, such devices comprise a storage portion for storing an aerosol forming precursor, which can comprise for example a liquid or a solid. A heating system is formed of one or more electrically activated resistive heating elements arranged to heat said precursor to generate the aerosol. The aerosol is released into a flow path extending between an inlet and outlet of the device. The outlet may be arranged as a mouthpiece, through which a user inhales for delivery of the aerosol.

In some aerosol generation devices, the precursor is stored in a removable cartridge. Thus, when the precursor is consumed, the cartridge can be easily removed and replaced. In order to attach the removable cartridge to the device body, a screw-threaded connection can for example be used.

Some of the known aerosol generation devices comprise a flow sensor used to trigger the operation of the device. Thus, the operation of the device can be triggered automatically when the user makes a puff. To ensure this functionality, the flow sensor, as for example a pressure sensor, is arranged in communication with a flow channel extending through the device, and is connected to a controller of the device. When it detects a flow in the channel, it sends a corresponding signal to the controller which activates the operation, for example of the heater.

However, the flow sensors known in the art are not fully satisfactory. Particularly, their dimensions are relatively important that may affect considerably the device's design. Additionally, in some cases, their operation is not efficient and a puff cannot be detected as it is desired by the user.

SUMMARY OF THE INVENTION

One of the aims of the present invention is to provide an aerosol generation device comprising a flow sensor which is compact and able to detect an airflow in a particularly efficient way.

For this purpose, the invention relates to an aerosol generation device, comprising:
  a bracket extending along a device axis;
  an outside casing delimiting an interior part of the device configured to receive the bracket and defining an atomizer compartment and a power block compartment;
  a pressure capture assembly comprising a pressure sensor, a flexible housing configured to receive the pressure sensor and a holder configured to fix the flexible housing with the pressure sensor on the bracket;
  wherein the pressure capture assembly is designed to be arranged on the bracket between the power block compartment and the atomizer compartment to prevent air passage between these compartments.

The bracket can be configured to receive and support a plurality of internal components of the device. The plurality of internal components can include at least one among the following components: a battery, a printed circuit board and a contact assembly.

Indeed, using the pressure sensor assembly, it is possible to isolate the atomizer compartment from the power block compartment. Thus, by comparing the pressure difference between these compartments, the pressure sensor can efficiently detect an airflow. Additionally, the pressure sensor assembly makes it possible to arrange the pressure sensor in a compact way, without substantially affecting the device's design.

Additionally, using a flexible housing to receive and support the pressure sensor ensures efficiently air impermeability between the atomizer and power block compartments. Particularly, in this case, the flexible housing can have an increased contact surface with the pressure sensor so as to minimize the risk of air leakage between the pressure sensor and its supporting structure. Moreover, since the flexible housing is in contact with the bracket, the risk of air leakage can also be minimized between the bracket and the structure supporting the sensor. In other words, according to the invention, the flexible housing has both support and sealing functionalities that increases considerably air impermeability between the atomizer and power block compartments and as a consequence, efficiency of airflow detection. Moreover, according to the invention, the flexible housing is fixed to the bracket with the holder which can take any suitable shape to fill the space between the flexible housing and the bracket. Particularly, the holder can extend partially around the flexible housing to fix it efficiently with the pressure sensor received inside, to the bracket. For example, the holder can abut the flexible housing against the bracket.

According to some embodiments, the atomizer compartment defines a flow channel extending between a flow inlet and a flow outlet, the flow inlet being arranged on the outside casing.

According to some embodiments:
  the pressure sensor defines two opposite sensing surfaces and a lateral surface extending between the sensing surfaces, one of the sensing surface being exposed to the flow channel of the atomizer compartment and the other sensing surface being exposed to the power block compartment;
  the pressure sensor being configured to detect a difference of pressure exerted on the sensing surfaces;
  the outside casing defines a hole opening to the power block compartment.

Thanks to these features, the pressure sensor is able to detect an airflow in the atomizer compartment by analyzing the pressure difference between the atomizer compartment and the power block compartment.

According to some embodiments, the flexible housing defines a sensor cavity configured to receive the pressure sensor and delimited by a lateral wall designed to be in contact with the lateral surface of the pressure sensor.

According to some embodiments, the sensor cavity is further delimited by a back wall protruding from the lateral wall and designed to cover partially one of the sensing surfaces of the pressure sensor.

According to some embodiments, the back wall delimits a flow passage designed to link the flow channel of the atomizer compartment and the corresponding sensing surface of the pressure sensor.

Thanks to these features, it is possible to arrange the pressure sensor in the pressure capture assembly in a sealed way.

According to some embodiments, the bracket defines a support wall extending along the device axis and having a U-shape cross section, the support wall defining an internal surface;

wherein the flexible housing defines a bottom portion designed to be in contact with the internal surface of the support wall.

According to some embodiments, the flexible housing is designed to extend between the internal surface of the support wall and an internal surface of the outside casing.

According to some embodiments, the holder is configured to fill the space formed between the internal surface of the support wall, the internal surface of the outside casing and the flexible housing.

Thanks to these features, the pressure capture assembly can be arranged in respect with the bracket so as to seal the passage between the power block compartment and the atomizer compartment.

According to some embodiments, the holder is further configured to abut the flexible housing against the internal surface of the support wall.

Thanks to these features, the pressure capture assembly can be fixed to the bracket.

According to some embodiments, the bracket further defines a delimiting wall in the atomizer compartment, the delimiting wall extending substantially perpendicularly to the device axis and delimiting partially a contact cavity, the contact cavity being arranged between the pressure sensor assembly and the delimiting wall.

According to some embodiments, the aerosol generation device further comprises a contact assembly arranged in the contact cavity and comprising a pair of contacts crossing the delimiting wall.

According to some embodiments, the pressure capture assembly is designed to abut the contact assembly against the delimiting wall.

Thanks to these features, it is possible to fix efficiently the contact assembly. This fixation is able to support cartridge inserting into a payload compartment and pressure exerted on the contact assembly while inserting.

According to some embodiments, the delimiting wall is crossed by a flow bypass designed to link the flow channel of the atomizer compartment to the flow passage.

Thanks to these features, the pressure sensor is able detect a pressure difference between the atomizer and power block compartments.

The invention also relates to an assembly method of an aerosol generation device as defined above, comprising the following steps:
- insert the pressure sensor into the flexible housing;
- insert the flexible housing with the pressure sensor in the bracket;
- lock the flexible housing with the pressure sensor in the bracket by the holder;
- slide the bracket into the outside casing.

BRIEF DESCRIPTION OF THE DRAWINGS

The invention and its advantages will be better understood upon reading the following description, which is given solely by way of non-limiting example and which is made with reference to the appended drawings, in which.

DETAILED DESCRIPTION OF THE INVENTION

Before describing the invention, it is to be understood that it is not limited to the details of construction set forth in the following description. It will be apparent to those skilled in the art having the benefit of the present disclosure that the invention is capable of other embodiments and of being practiced or being carried out in various ways.

As used herein, the term "aerosol generation device" or "device" may include a vaping device to deliver an aerosol to a user, including an aerosol for vaping, by means of aerosol generating unit (e.g. an aerosol generating element which generates vapor which condenses into an aerosol before delivery to an outlet of the device at, for example, a mouthpiece, for inhalation by a user). The device may be portable. "Portable" may refer to the device being for use when held by a user. The device may be adapted to generate a variable amount of aerosol, e.g. by activating a heater system for a variable amount of time (as opposed to a metered dose of aerosol), which can be controlled by a trigger. The trigger may be user activated, such as a vaping button and/or inhalation sensor. The inhalation sensor may be sensitive to the strength of inhalation as well as the duration of inhalation to enable a variable amount of vapor to be provided (so as to mimic the effect of smoking a conventional combustible smoking article such as a cigarette, cigar or pipe, etc.). The device may include a temperature regulation control to drive the temperature of the heater and/or the heated aerosol generating substance (aerosol pre-cursor) to a specified target temperature and thereafter to maintain the temperature at the target temperature that enables efficient generation of aerosol.

As used herein, the term "aerosol" may include a suspension of precursor as one or more of: solid particles; liquid droplets; gas. Said suspension may be in a gas including air. Aerosol herein may generally refer to/include a vapor. Aerosol may include one or more components of the precursor.

As used herein, the term "aerosol-forming precursor" or "precursor" or "aerosol-forming substance" or "substance" or "vaporizable material" is used to designate any material that is vaporizable in air to form aerosol. Vaporisation is generally obtained by a temperature increase up to the boiling point of the vaporization material, such as at a temperature up to 400° C., preferably up to 350° C. The vaporizable material may, for example, comprise or consist of an aerosol-generating liquid, gel, or wax or the like or an aerosol-generating solid that may be in the form of a rod, which contains processed tobacco material, a crimped sheet or oriented strips of reconstituted tobacco (RTB), or any combination of these. The vaporizable material may comprise one or more of: nicotine; caffeine or other active components. The active component may be carried with a carrier, which may be a liquid. The carrier may include propylene glycol or glycerin. A flavoring may also be present. The flavoring may include Ethylvanillin (vanilla), menthol, Isoamyl acetate (banana oil) or similar.

Figure 1:
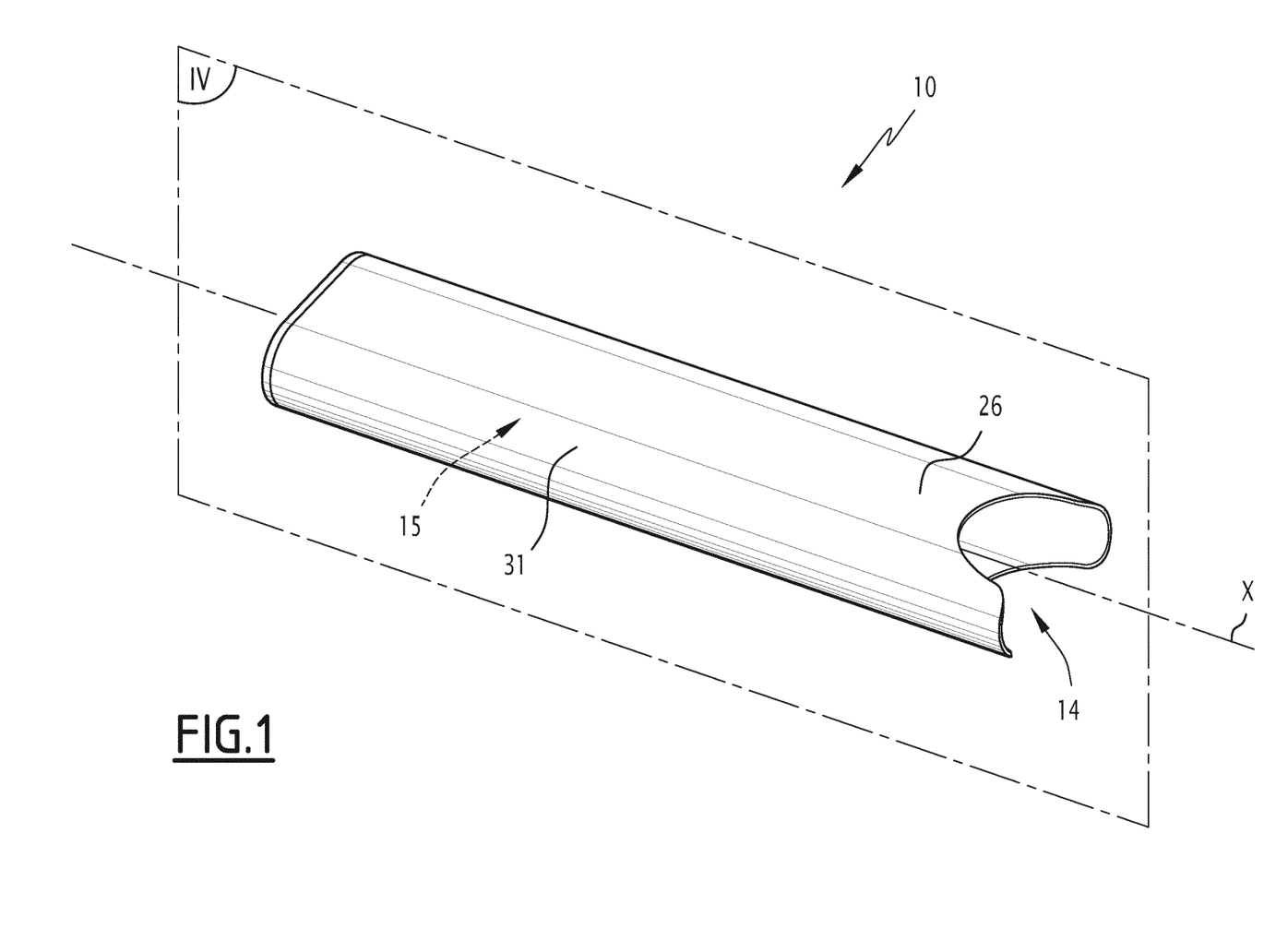
FIG. 1 is a perspective view of an aerosol generation device according to the invention, the aerosol generation device comprising notably a pressure capture assembly and a bracket.

An aerosol generation device 10 according to the invention is showed on FIG. 1. In the example of this FIG. 1, the aerosol generation device 10 is designed to operate with a removable cartridge (not showed) which is intended to be received in an atomizer compartment 14 also visible on FIG. 1. The cartridge comprises a precursor storage portion able to store a precursor and at least a heater able to heat the precursor to generate aerosol. The heater of the cartridge is connected electrically to a power source of the device 10 through a pair of contacts arranged in both cartridge and aerosol generation device 10. According to another embodiment of the invention, the heater of the cartridge may be coupled with a heating element arranged in the device 10 and powered by the power source of this device 10. In this case, heat is transmitted directly from the heating element of the device to the heater of the cartridge. According to still another embodiment of the invention, the payload compartment 14 defines a fixed, in respect to the device 10, precursor storage portion. In this case, the precursor storage portion can for example be refilled with a precursor.

Figure 2:
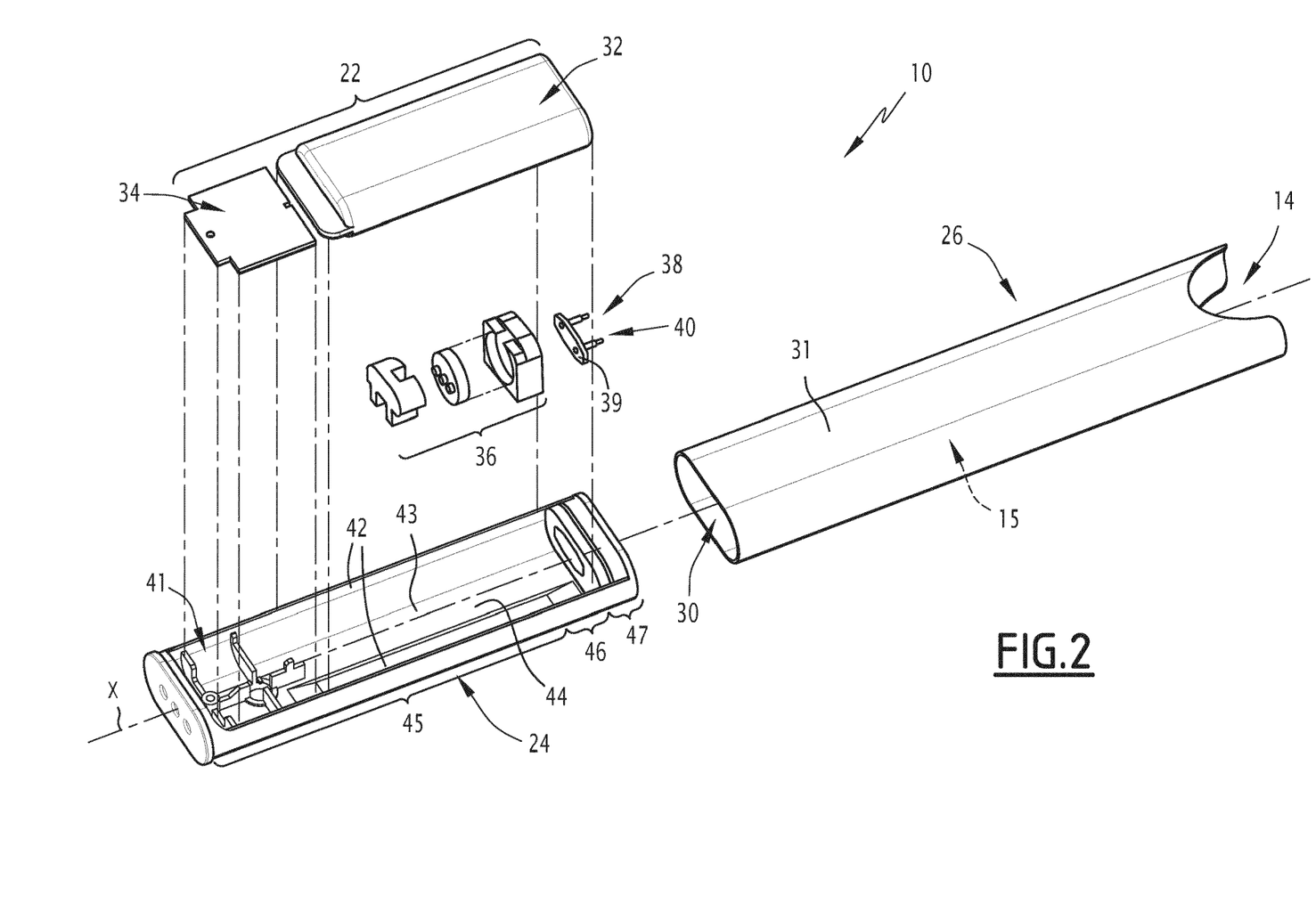
FIG. 2 is an exploded view of the aerosol generation device of FIG. 1.

The aerosol generation device 10 extends along an axis X called hereinafter device axis X. Referring to FIG. 1 and FIG. 2, the aerosol generation device 10 comprises a plurality of internal components 22, a bracket 24 configured to support the internal components 22 and an outside casing 26 configured to receive the bracket 24 with the internal components 22.

The outside casing 26 extends along the device axis X and delimits an interior part of the device 10 able to receive notably the bracket 24 with the internal components 22 through an insertion opening 30 extending perpendicularly to the device axis X, as it is showed on FIG. 2. The outside casing 26 comprises a side surface 31 extending along the device axis X. The side surface 31 may define one or several fixing apertures (not showed) used to fix the bracket 24 into the outside casing 26. The outside casing 26 can be made of a single piece, from for example a metallic material. The side surface 31 may be a smooth surface.

The interior part of the device 10 comprises the atomizer compartment 14 mentioned above and a power block compartment 15. The atomizer compartment 14 defines a flow channel (not showed) extending between a flow inlet and a flow outlet. The flow inlet is arranged on the side surface 31 of the outside casing 31. The flow outlet is arranged on a mouthpiece piece arranged for example on the cartridge. Thus, the flow channel extends at least partially through the cartridge and notably through the heater of the cartridge. Thus, while user's puffs, the airflow enters through the flow inlet, passes through the heater where it is mixed with the vaporized precursor and exists through the flow outlet in a form of aerosol. The atomizer compartment 14 further comprises at least one element intended to be in contact with the cartridge, as it will be explained below. The power block compartment 15 comprises notably a power source intended to power the heater of the cartridge as it will be also explained below. The outside casing 26 defines a hole opening to the power block compartment 15. Due to this hole, the pressure inside the power block compartment 15 is substantially equal to the pressure outside the device 10.

The internal components 22 comprise notably a battery 32, a printed circuit board 34, a pressure capture assembly 36 and a contact assembly 38. The battery 32 is for example a rechargeable lithium-ion battery known in the art. The printed circuit board 34 comprises a plurality of electronic components configured to control the operation of the aerosol generation device 10. Particularly, the printed circuit board 34 comprises a controller (not showed) configured to control for example a voltage provided by the battery 32 to the heater of the cartridge. The printed circuit board 34 may further comprise an indicator such a LED and/or a switch. The pressure capture assembly 36 is designed to detect an airflow in the atomizer compartment 14 as it will be explained in further detail below. Upon detecting an airflow, the pressure capture assembly 36 is configured to send a signal to the controller which can for example trigger the operation of the heater basing on this signal. For this proposer, the pressure capture assembly is connected, for example by wires, to the controller. The contact assembly 38 comprises a contact plate 39 and a pair of contacts 40 (also visible on FIG. 4). The contact plate 39 is intended to extend for example perpendicularly to the device axis X and is connected electrically to the battery 32 via the controller to power the heater. In the example of FIG. 2, the pair of contacts 40 consists of two pins fixed on the contact plate 39 and protruding from it according to the device axis X. As it is visible on FIG. 4, each pin presents a shouldered shape and defines a thick portion adjacent to the plate 39 and a thin portion adjacent to the thick portion. The pair of contacts 40 is configured to cooperate with the corresponding pair of contacts arranged in the cartridge to power the heater of the cartridge.

In the example of FIG. 2, the bracket 24 defines a support wall 41 extending along the device axis X and having a U-shape cross-section. Particularly, as it showed on FIGS. 2 and 5, the support wall 41 may define two lateral sections 42 extending symmetrically in respect with the device axis X and a central section 43 extending between the lateral sections 42. The support wall 41 further defines an internal surface 44 facing the internal components 22 when they are fixed on the bracket 24.

Additionally, the bracket 24 defines successively arranged along the device axis X, a first portion 45 able to receive the printed circuit board 34 and the battery 32, a second portion 46 able to receive the pressure capture assembly 36 and a third portion 47 able to receive the contact assembly 38. When the bracket 24 is inserted into the casing 26, the first portion 45 is arranged in the power block compartment 15 and the third portion 47 is arranged in the atomizer compartment 14. Thus, in this case, the second portion 46 with the pressure capture assembly 36 is arranged between the power block compartment 15 and the atomizer compartment 14.

As it is showed on FIG. 2, the first portion 45 defines fixing means (like a clip, screw hole, etc.) able to fix the printed circuit board 34 and the battery 32. The second portion 46 defines fixing means 49 (visible on FIG. 5) able to fix the pressure capture assembly 36 and notably a holder of this assembly as it will be explained below. As it showed in detail on FIG. 4, the third portion 47 defines a flow bypass 50 delimited by a bypass wall and extending along the device axis X through the whole length of the third portion 47. The third portion 47 further defines a delimiting wall 51 extending perpendicularly to the device axis X and a contact cavity 52 delimited by the bypass wall, the support wall 41 and the delimiting wall 51. The delimiting wall 51 is crossed by the flow bypass 50 and defines a pair of holes. The contact cavity 52 is configured to receive the contact assembly 38 though an opening to the second portion 46 so as the thin portions of the pins of this assembly 38 crosses the delimiting wall 51 through the respective holes and the thick portions of these pins abut against the delimiting wall 51.

Figure 3:
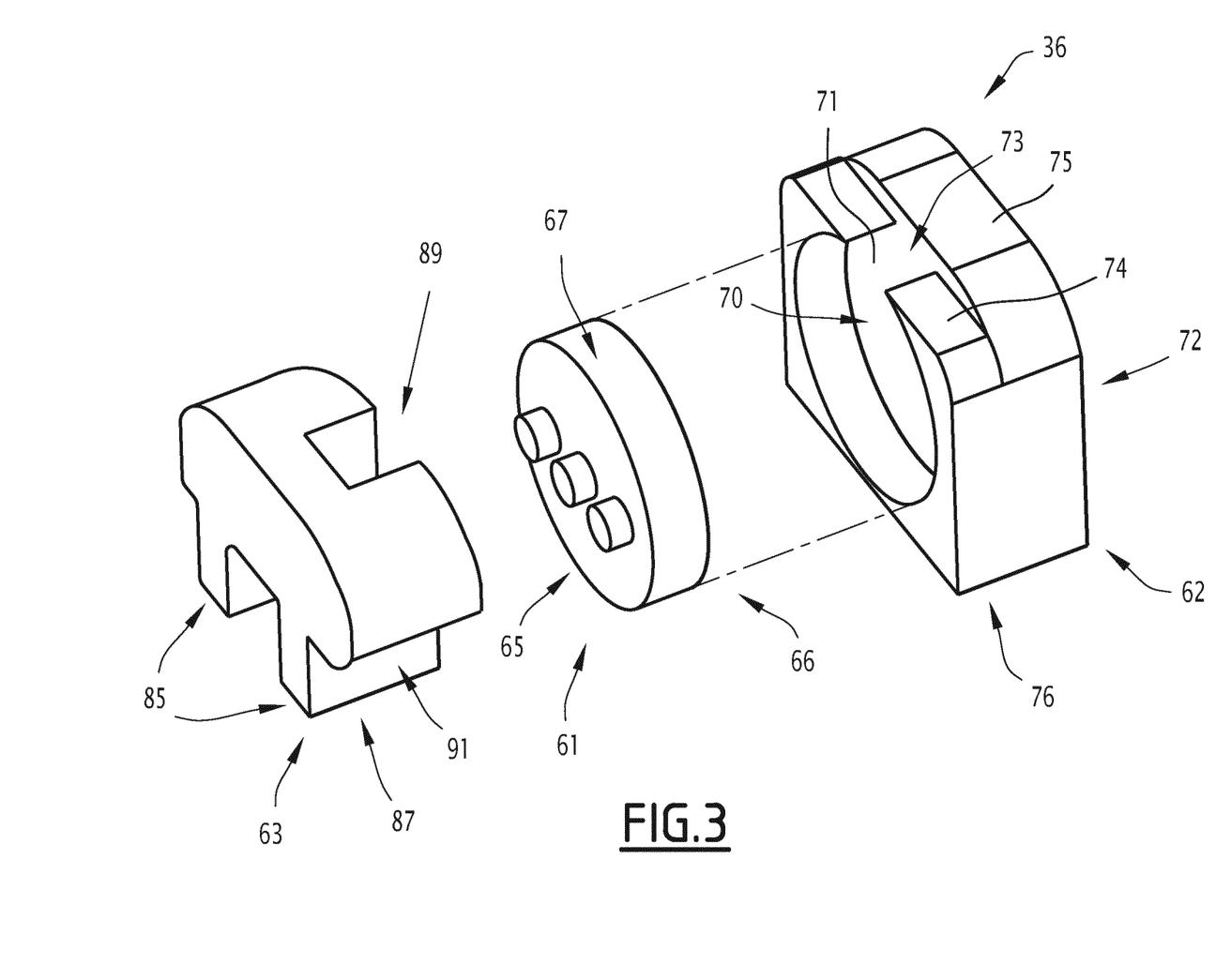
FIG. 3 is an exploded view of the pressure capture assembly of FIG. 1.

Referring to FIG. 3, the pressure capture assembly 36 comprises a pressure sensor 61, a flexible housing 62 configured to receive the pressure sensor 61 and a holder 63 configured to fix the flexible housing 62 with the pressure sensor 61 on the bracket 24.

The pressure sensor 61 presents for example a cylindrical shape and defines two opposite sensing surfaces 65, 66 and a lateral surface 67 extending between the sensing surfaces 65, 66. The sensing surface 66 is intended to be exposed to the flow channel of the atomizer compartment 14 and the sensing surface 65 is intended to be exposed to the power block compartment 15. The pressure sensor 61 is configured to detect a difference of pressure exerted on the sensing surfaces 65, 66. If this difference is greater than a predetermined threshold, the pressure sensor 61 is able to send the corresponding signal to the controller. For this purpose, for example the sensing surface 65 may comprises contacts connecting the sensor 61 to the controller as well as to the battery 32.

The flexible housing 62 is made of a flexible material like for example a silicone rubber. The flexible housing 62 defines a sensor cavity 70 configured to receive the pressure sensor 61 and delimited by a lateral wall 71 designed to be in contact with the lateral surface 67 of the pressure sensor 61. The sensor cavity 70 is further delimited by a back wall 72 protruding from the lateral wall 71 and designed to cover partially the sensing surface 66 of the pressure sensor 61. According to the example of FIG. 3, the sensor cavity 70 presents substantially a cylindrical shape delimiting an opening 73 to a flat portion 74 of the flexible housing 62. In this case, the lateral wall 71 of the sensor cavity 70 is intended to extend circumferentially around the lateral surface 67 of the sensor 61 except the portion of this lateral surface 67 facing the opening 73. This portion of the lateral surface 67 may protrude from the opening 73 and consequently from the flat portion 74 of the flexible housing 62, or form a smooth surface with the flat portion 74.

The lateral wall 71 further defines a top portion 75 protruding from the flat portion 74 and a bottom portion 76. The top portion 75 is designed to be in a close contact with an internal surface of the outer casing 26 when the flexible housing 62 is received in the second portion 46 of the bracket 24 and the bracket 24 is received in the outside housing 26. In the same position, the bottom portion 76 is designed to be in a close contact with the central section 43 of the support wall 41 of the bracket 24, for example without be in contact with the lateral sections 42 of this support wall 41. In other words, in this position, the flexible housing 62 extends between the internal surface 44 of the support wall 14 and the internal surface of the outside casing 26. Additionally, the close contact of the top and bottom portions 75, 76 with the corresponding parts of the respective internal surfaces, prevents air passage in these parts.

Figure 4:
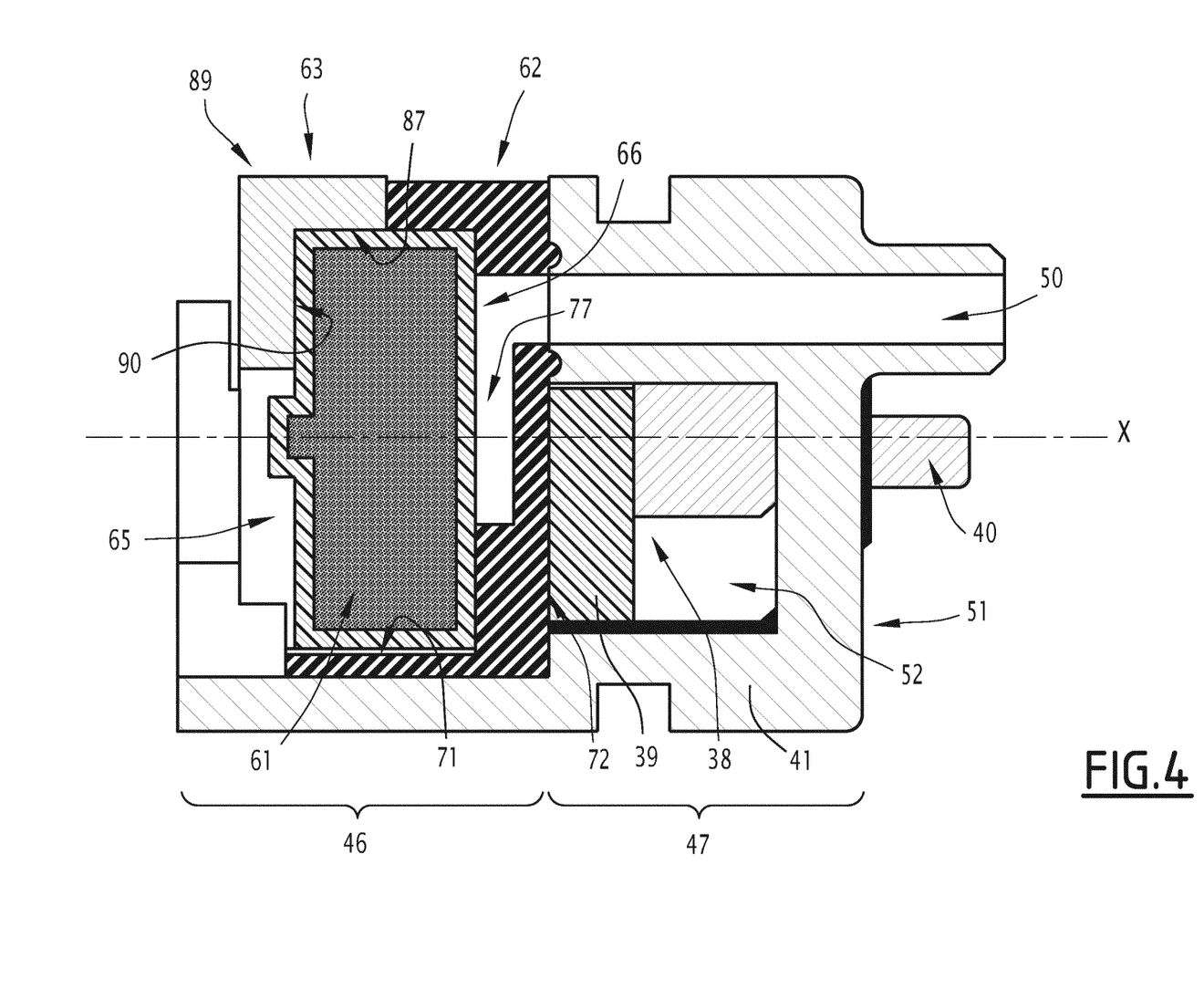
FIG. 4 is a cross-sectional view of a part of the aerosol generation device according to plane IV of FIG. 1.

As it is visible on FIG. 4, the back wall 72 protrudes circumferentially from the lateral wall 71 so as to cover partially the sensing surface 66 of the sensor 61. Thus, the pressure sensor 61 can be abutted according to the device axis X against the back wall 72. The back wall 72 delimits a flow passage 77 designed to link the flow channel of the atomizer compartment 14 and the non-covered part of the sensing surface 66 of the pressure sensor 61. For this purpose, when the flexible housing 62 is received in the second portion 46 of the bracket 24, the flow passage 77 faces the flow bypass 50 and can be fixed to the bypass wall or abutted against it. Additionally, in this position, the flexible housing 62 locks the contact assembly 38 into the contact cavity 52. For this purpose, the back wall 72 can be in contact with the contact plate 39 in order to abut the contact assembly 38 against the delimiting wall 51.

The holder 63 is made for example of a solid material, like for example a metal, and is configured to fill the space formed between the internal surface 44 of the support wall 41, the internal surface of the outside casing 26 and the flexible housing 62. Thus, in other words, the holder 63 is configured to fit closely the external shape of the flexible housing 62 so as to seal air passage between the power block compartment 15 and the atomizer compartment 14. For this purpose, the holder 63 defines a pair of legs 85 designed to extend on each side of the flexible housing 62. Particularly, each leg 85 is designed to extend between one of the lateral sections 42 of the support wall 41 of the bracket 24 and the corresponding portion of the lateral wall 71 of the flexible housing 62.

Figure 5:
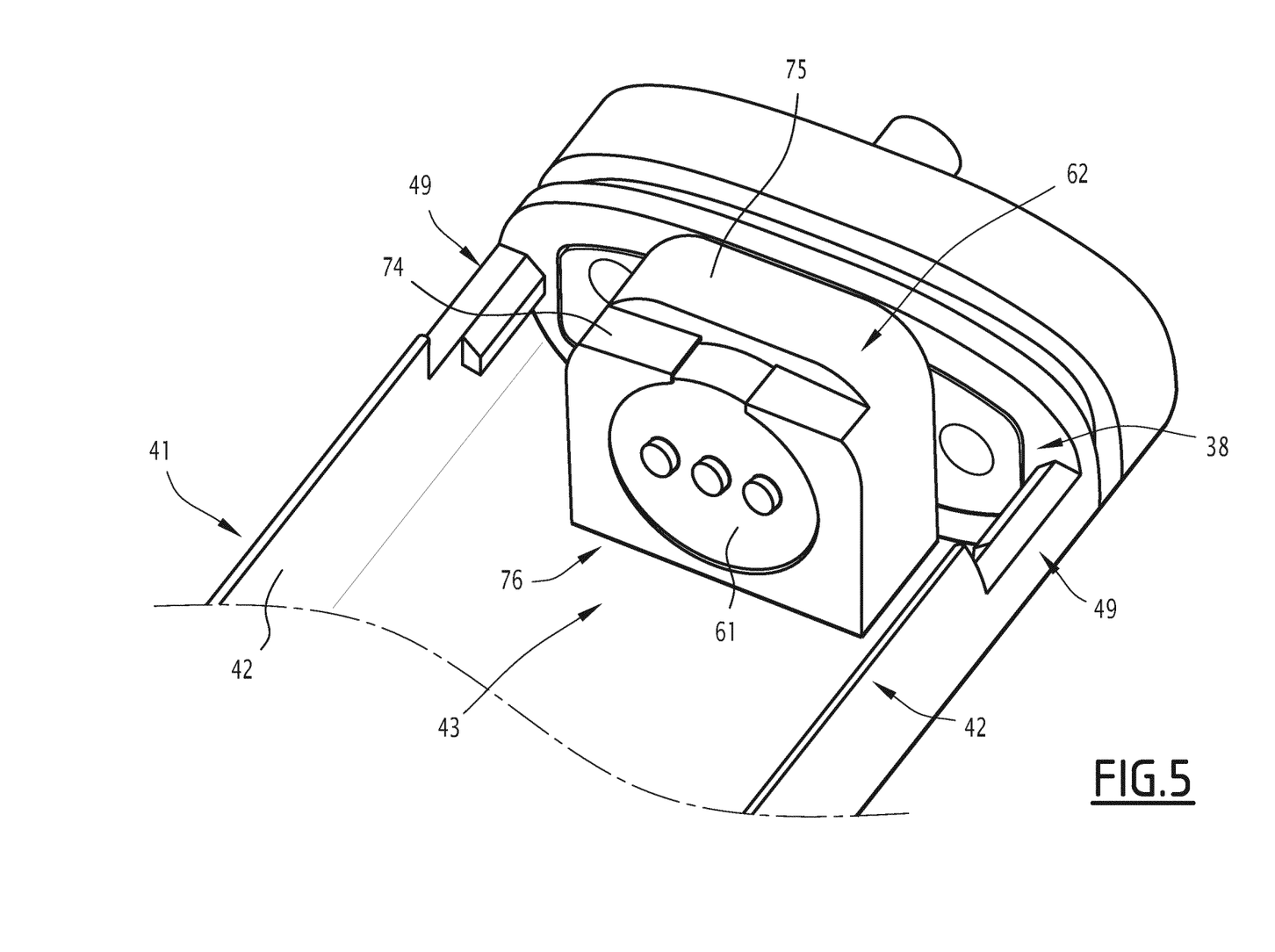
FIG. 5 is a perspective view of a part of the pressure capture assembly fixed on the bracket of FIG. 1.

The holder 63 is further configured to fix the flexible housing 62 with the pressure sensor 61 by abutting these elements against the support wall 41. For this purpose, the holder 63 defines an abutting surface 87 intending to cooperate with the flat portion 74 of the flexible housing 62 and a contacting surface 89 opposite to the abutting surface 87 and intending to be in contact with the internal surface of the outside casing 26 when the bracket 24 is received in the outside casing 26. Additionally, the holder 63 may define a covering surface 90 extending perpendicularly to the abutting surface 87 and designed to cover partially the sensing surface 65 of the pressure sensor 61. Finally, the holder 63 defines fixing means 91 able to cooperate with the fixing means 49 of the bracket 24 to fix the holder 63 to the bracket 24. In the example of FIG. 5, the fixing means 49 of the bracket 24 present a pair of clips, each clip being arranged on one of the lateral sections 42 of the support wall 41. In this case, the fixing means 91 of the holder present a pair of recess cuts, each recess cut being able to cooperate with the corresponding clip.

An assembly method of the aerosol generation device 10 according to the invention will now be explained. At the initial step, the pressure sensor 61 is inserted into the flexible housing 62 and notably into to the sensor cavity 70. Then, the contact assembly 38 is inserted into the contact cavity 52 and the flexible housing 62 with the pressure sensor 61 is inserted into the second portion 46 of the bracket 24. Then, the flexible housing 62 with the pressure sensor 61 is locked in the bracket 24 by the holder 63 using notably the fixing means 91, 49. Then, other internal components 22 like the battery 32 and the printed circuit board 34 are fixed in the first portion 45 of the bracket 24. Finally, the bracket 24 with the fixed internal components 22 is slid into the outside casing 26 through the insertion opening 30.

The invention claimed is:
1. An aerosol generation device, comprising:
a bracket having an interior cavity extending along a device axis (X), the bracket configured to receive and support a plurality of internal components of the device within the interior cavity;
an outside casing delimiting an interior part of the device configured to receive the bracket, and the outside casing defining an atomizer compartment and a power block compartment; and
a pressure capture assembly comprising a pressure sensor, a flexible housing configured to receive and support the pressure sensor, and a holder configured to fix the flexible housing with the pressure sensor within the interior cavity of the bracket such that the flexible housing is in contact with the bracket,
wherein the pressure capture assembly is designed to be arranged within the interior cavity of the bracket between the power block compartment and the atomizer compartment to prevent air passage between these compartments.

2. The aerosol generation device according to claim 1, wherein the atomizer compartment defines a flow channel extending between a flow inlet and a flow outlet, the flow inlet being arranged on the outside casing.

3. The aerosol generation device according to claim 2, wherein:
the pressure sensor defines two opposite sensing surfaces and a lateral surface extending between the sensing surfaces, one of the sensing surfaces being exposed to the flow channel of the atomizer compartment and the other sensing surface being exposed to the power block compartment (15);
the pressure sensor being configured to detect a difference of pressure exerted on the sensing surfaces; and
the outside casing defines a hole opening to the power block compartment.

4. The aerosol generation device according to claim 3, wherein the flexible housing defines a sensor cavity configured to receive the pressure sensor, the sensor cavity being delimited by a lateral wall designed to be in contact with the lateral surface of the pressure sensor.

5. The aerosol generation device according to claim 4, wherein the sensor cavity is further delimited by a back wall protruding from the lateral wall and designed to cover, at least partially, one of the sensing surfaces of the pressure sensor.

6. The aerosol generation device according to claim 5, wherein the back wall delimits a flow passage designed to link the flow channel of the atomizer compartment and the corresponding sensing surface of the pressure sensor.

7. The aerosol generation device according to claim 6, wherein the bracket further defines a delimiting wall in the atomizer compartment, the delimiting wall extending substantially perpendicularly to the device axis (X) and delimiting, at least partially, a contact cavity, the contact cavity being arranged between the pressure sensor assembly and the delimiting wall, and
wherein the delimiting wall is crossed by a flow bypass designed to link the flow channel of the atomizer compartment to the flow passage.

8. The aerosol generation device according to claim 1, wherein the bracket defines a support wall extending along the device axis (X) and having a U-shape cross section, the support wall defining an internal surface,
wherein the flexible housing defines a bottom portion designed to be in contact with the internal surface of the support wall.

9. The aerosol generation device according to claim 8, wherein the flexible housing is designed to extend between the internal surface of the support wall and an internal surface of the outside casing.

10. The aerosol generation device according to claim 9, wherein the holder is configured to fill the space formed between the internal surface of the support wall, the internal surface of the outside casing, and the flexible housing.

11. The aerosol generation device according to claim 8, wherein the holder is further configured to abut the flexible housing against the internal surface of the support wall.

12. The aerosol generation device according to claim 1, wherein the bracket further defines a delimiting wall in the atomizer compartment, the delimiting wall extending substantially perpendicularly to the device axis (X) and delimiting, at least partially, contact cavity, the contact cavity being arranged between the pressure sensor assembly and the delimiting wall.

13. The aerosol generation device according to claim 12, further comprising a contact assembly arranged in the contact cavity and comprising a pair of contacts crossing the delimiting wall.

14. The aerosol generation device according to claim 13, wherein the pressure capture assembly is designed to abut the contact assembly against the delimiting wall.

15. An assembly method of an aerosol generation device according to claim 1, the method comprising:
inserting the pressure sensor into the flexible housing;
inserting the flexible housing with the pressure sensor in the bracket;
locking the flexible housing with the pressure sensor in the bracket by the holder; and
sliding the bracket into the outside casing.

* * * * *